UNITED STATES PATENT OFFICE.

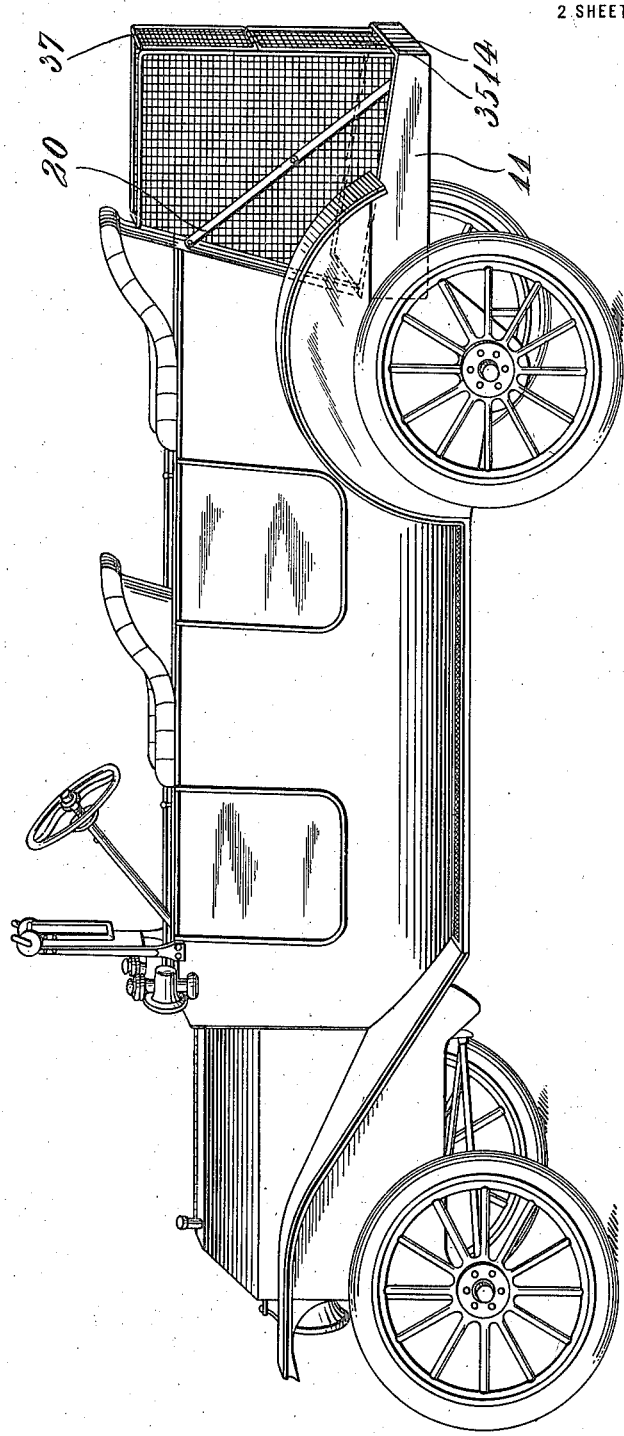

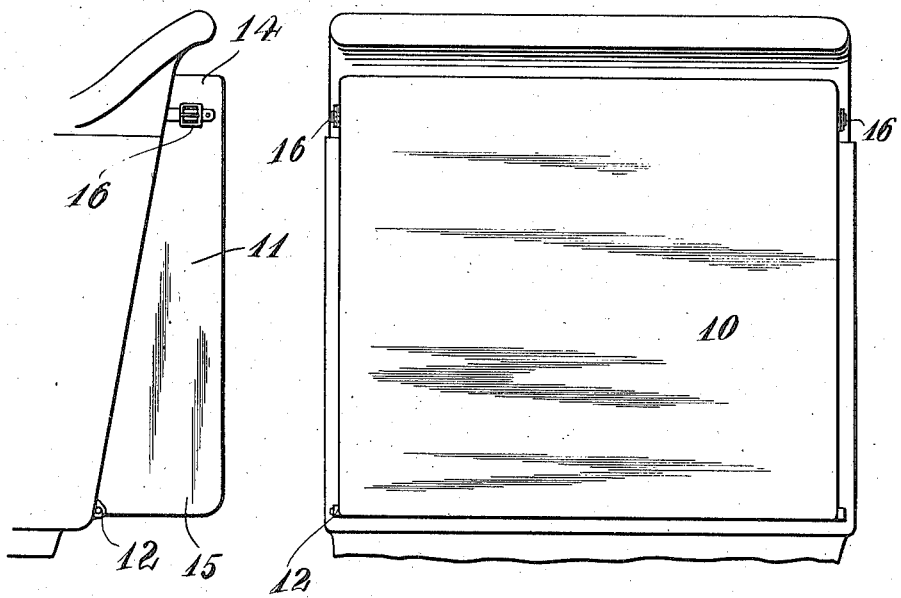

LOIS PUCHER, OF DETROIT, MICHIGAN.

PACKAGE-CARRIER.

1,232,970.　　　　Specification of Letters Patent.　　Patented July 10, 1917.

Application filed April 27, 1916. Serial No. 93,821.

*To all whom it may concern:*

Be it known that I, LOIS PUCHER, a subject of the Emperor of Austria, and a resident of Detroit, in the county of Wayne and State of Michigan, have invented certain new and useful Improvements in Package-Carriers, of which the following is a specification.

This invention relates to improvements in attachments to vehicles whereby carriers are provided to convey accessories, packages and parcels of goods without conflicting with the carrying capacity of the vehicle.

The principal object of the invention is to provide means which may be attached to cars of ordinary construction without interference with their functions and which may be used as a container for miscellaneous objects.

Another object is to provide such containers in forms which are readily collapsible, so that when not required for use, the same may be folded or collapsed in such manner as to be inconspicuous, and finally, to provide such containers of large carrying capacity, and which are of pleasing appearance.

These and other objects are attained by the novel construction and combination of parts hereafter described and shown in the accompanying drawings, forming a material part of this specification, and in which:—

Figure 1 is a perspective view of a conventional type of automobile, illustrating the invention, the same being shown in an extended position.

Fig. 2 is a rear view of the attachment, shown in a closed position.

Fig. 3 is a side elevation of the same.

Fig. 4 is a side elevation of the attachment shown in an open position, the receptacle being partly broken away and shown in section, and Fig. 5 is a sectional view taken on line 5—5 of Fig. 4, the figure being partly broken away.

The device comprises a casing having a rear wall 10, connecting with side walls 11, which are engaged by hinges 12 to any preferred part of the vehicle, as at the rear, the sides 11 being so shaped, as to preferably bring the rear plate 10 into a substantially vertical position, when normally erect.

The upper and lower plates respectively 14 and 15 together with the sides 11 and the rear plate 10, form an open receptacle which may be attached to the vehicle, by the hinges 12 and by strap and buckle fastenings 16, one of the straps being secured to the vehicle and the other to the upper part of the narrow sides 11. Thus, when the container is in an upright position, it occupies but a minimum of space, and is preferably finished so as to have the appearance of a part of the vehicle.

When it is desired to make use of the container, the fastenings 16 are loosened allowing the container to swing upon the hinges 12 into a horizontal position, limited by the jointed pivotal links 20, one end of each being engaged with fixed pins 21 secured to the rear of the vehicle, while the lower outer ends 22 are secured to the side plates 11, thereby forming an adequate sustaining means for the receptacle and whatever articles are contained therein.

The outer portion of the receptacle is formed with a chamber next the wall 10, adapted to contain an extra tire 40 for the vehicle, the same being held in such manner as to be secured against loss or damage, and also against the effects of the weather, it being covered by a removable plate 25, made in two sections, the marginal edge of one overlapping the other, both being thus susceptible of being clamped by the lever handle nut 28, the plates being held in operative position by reason of their being inserted through open slots formed in the corner stays 30.

In the interior of the receptacle, engaged by hinges 32, are side frames 31 extending between the elements of which are sheets of woven wire netting 33, so as to present a light, yet strong construction, the front cover element 34, being of similar construction, while the opposite outer side is covered by a similarly constructed shorter cover element 35, connected by hinges 36 to the upper element 37.

Thus it will be seen that an extra tire or the like may always be carried within the receptacle in whatever position it may be in, and that when the receptacle is raised in the position shown in Figs. 2 and 3 it occupies no space in the vehicle, and very little upon its exterior.

When extended, as shown in Fig. 1, it will be evident that the device is firmly supported, and capable of being used as a receiver for whatever objects it may be desired to transport. When collapsed or folded, the enframed net wall elements are entirely inclosed within the container body and invisible from the exterior, the element 37 being folded against the element 35, both then folded over upon the outer side of the plates 25 whereupon the side elements are folded inwardly within the space bounded by the frame sides 11, 14, and 15, permitting the receptacle to be raised and secured by the straps and buckles 16 against the rear of the vehicle.

Having thus described my invention, what I claim as new and desire to secure by Letters Patent, is:—

1. In a package carrier, the combination with a receptacle hingedly engaged at its lower front corner with a vehicle, means for securing the receptacle erect, means whereby said receptacle may be held in a horizontal position, a removable flooring in said receptacle, and a plurality of netted wall elements hingedly contained in said receptacle, said wall elements being foldable closely one upon another within said receptacle or extended therebeyond.

2. In a package carrier, the combination with an open container hingedly supported on one edge thereof, means for maintaining said container in an erect position, means for supporting said container when in a horizontal position, slotted braces within said container near its outer wall at the corners thereof, plates removably engaged within the slots of said braces forming a partition therewithin, and netted wall elements hingedly attached within said container adapted to be extended therebeyond.

3. In a package carrier adapted to be attached to a vehicle, a receptacle having its inner side wall angularly formed to suit the vehicle, hinges connecting said receptacle to the vehicle at the lower edge thereof, disengageable supporting means connecting said vehicle and the upper portion of said receptacle, links disposed in pairs upon either side of said receptacle, said links engaging between the vehicle and the side walls of said receptacle on the interior thereof, and a plurality of netted wall elements hingedly engaged within said receptacle and capable of being folded therewithin or extended therebeyond.

Signed at Detroit, in the county of Wayne, and State of Michigan, this 14th day of April, 1916.

LOIS PUCHER.